United States Patent
Oranday

(10) Patent No.: US 6,935,644 B1
(45) Date of Patent: Aug. 30, 2005

(54) PLASTIC BENDLESS LEGS FOR BUCKETS

(76) Inventor: Maximo E. Oranday, P.O. Box 951, Nocattee, FL (US) 34268

( * ) Notice: Subject to any disclaimer, the term of this patent is extended or adjusted under 35 U.S.C. 154(b) by 0 days.

(21) Appl. No.: 10/990,081

(22) Filed: Nov. 16, 2004

Related U.S. Application Data

(60) Provisional application No. 60/533,945, filed on Jan. 2, 2004.

(51) Int. Cl.[7] .............................................. B62B 3/02
(52) U.S. Cl. .............................. 280/47.34; 280/47.35; 280/79.5
(58) Field of Search ............................ 280/47.34, 651, 280/47.35, 87.03, 79.11, 79.3, 79.7, 79.6, 280/144, 145, 638, 79.5

(56) References Cited

U.S. PATENT DOCUMENTS

| | | | |
|---|---|---|---|
| 2,917,769 A * | 12/1959 | Kasper | 15/323 |
| 3,554,573 A * | 1/1971 | Miller | 280/79.2 |
| 3,734,527 A * | 5/1973 | Bard | 280/79.5 |
| 5,190,303 A * | 3/1993 | Schumacher et al. | 280/38 |
| 5,390,944 A * | 2/1995 | Sherwin | 280/47.35 |
| 5,433,463 A * | 7/1995 | Finley | 280/47.16 |
| 5,472,220 A * | 12/1995 | Stephan | 280/79.5 |
| 5,480,170 A * | 1/1996 | Kaiser, II | 280/30 |
| 5,695,205 A * | 12/1997 | Liu | 280/79.2 |
| 6,135,467 A * | 10/2000 | Tagariello | 280/79.5 |
| RE37,350 E * | 9/2001 | Stephan | 280/79.5 |
| 6,439,585 B1 * | 8/2002 | Tan | 280/47.26 |
| 6,547,264 B1 * | 4/2003 | Blackburn | 280/47.35 |
| 6,659,495 B1 * | 12/2003 | Sanderson | 280/651 |
| 6,729,631 B2 * | 5/2004 | Trine et al. | 280/79.5 |
| 2003/0227150 A1 * | 12/2003 | van Hekken | 280/79.3 |
| 2005/0046133 A1 * | 3/2005 | Braucke et al. | 280/47.35 |

FOREIGN PATENT DOCUMENTS

GB  2224701 A  *  5/1990  ............ B62B 1/14

* cited by examiner

Primary Examiner—J. Allen Shriver
(74) Attorney, Agent, or Firm—Frank A. Lukasik

(57) ABSTRACT

A combination of a window cleaning apparatus and adjustable/removable legs, the invention consisting of a bucket having loop material fastened thereto at locations for attaching four telescoping, adjustable legs having hook material fastened to the back side. A spring and pin are mounted in the upper portion of the leg with the pin mating with holes formed in the lower portion to adjust the height of the bucket. Locking casters are located in each of the leg bottoms.

1 Claim, 5 Drawing Sheets

PLASTIC BENDLESS LEGS FOR BUCKETS

RELATED INVENTION

This is a continuation of Disclosure Document 533798, Filed Jun. 26, 2003 and Provisional Patent Application Ser. No. 60/533,945 Filed Jan. 2, 2004.

BACKGROUND OF THE INVENTION

The instant invention pertains generally to a window cleaning apparatus and more particularly to a bucket with adjustable/removable legs, and more particularly a bucket used for washing windows which has removable legs attached to the sides. Prior art window washing buckets are generally used during the task of washing windows, are generally set on the floor or ground next to the working area. At the ground level, the window washer must bend over to reach the brush or squeegee or to wet/rinse either tool. This bending places a strain on the back of the window washer. The instant invention raises the level of the bucket to a level which can be reached without bending. The removable legs, reduce the area required to pack the bucket in a vehicle when the job is completed. It also provides a convenient place to conveniently store the brushes and squeegee within easy reach of the window washer.

Several prior art devices teach the use of removable, or adjustable legs. The U.S. Pat. No. 4,759,518 to Yardas discloses a trash bag support system comprising a stand supporting a textured circular support ring over which the lip of a trash bag can be folded. U.S. Pat. No. 4,889,300 to Gibson et al, discloses a trash bag support with collapsible legs. U.S. Pat. No. 5,632,460 to Strickland discloses a lamp holder with a plurality of legs which are removable.

SUMMARY OF THE INVENTION

The bucket used by window washers is generally rectangular or circular. The bucket of the invention contains four sections of hook and loop (VELCRO), and four legs. The legs are tapered from top to bottom and separated into two portions which may be assembled to provide an extended height leg. A section of loop material may be fastened to the upper portion of the legs and a section of hook material may be fastened to the bucket at each of the positions for mounting the legs. To assemble the legs, the upper and lower portions are mated. The hook material side of each of the upper portions are then placed in the desired positions and mated with the loop material. A band is then wrapped around the outer surfaces and encircles the bucket to provide a further support for the legs.

DETAILED DESCRIPTION OF THE INVENTION

Figure 1:
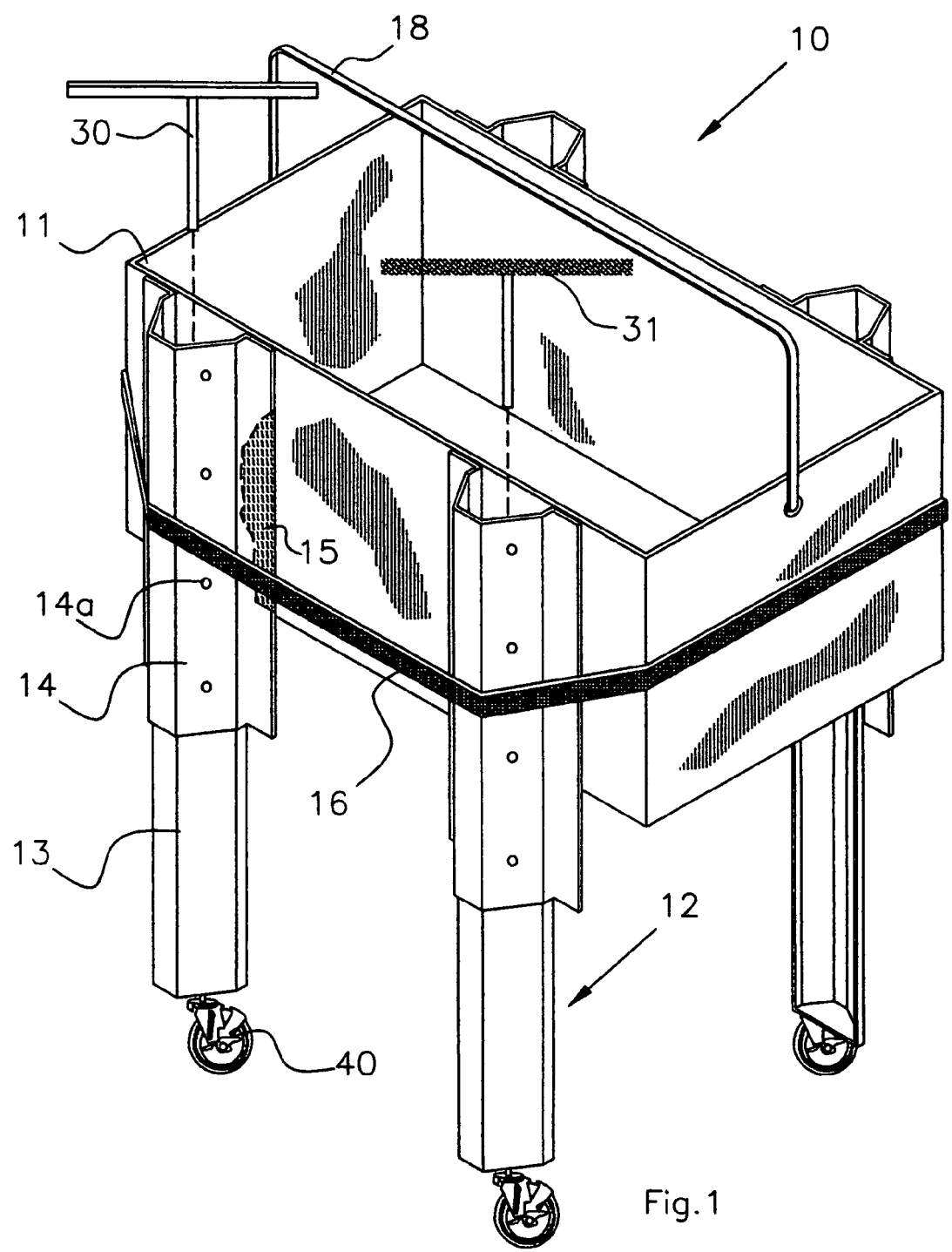
FIG. 1 is a top, perspective view of a first embodiment of the invention showing the relationship with tools.
Figure 2:
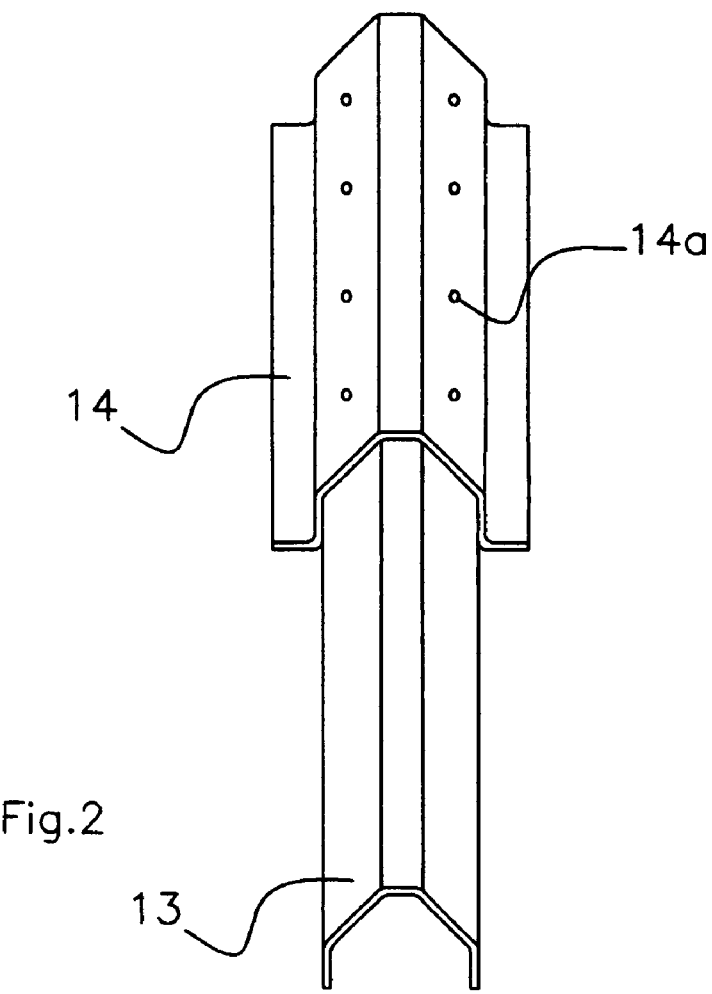
FIG. 2 is an exploded view of a bucket leg in accordance with the invention.
Figure 2B:
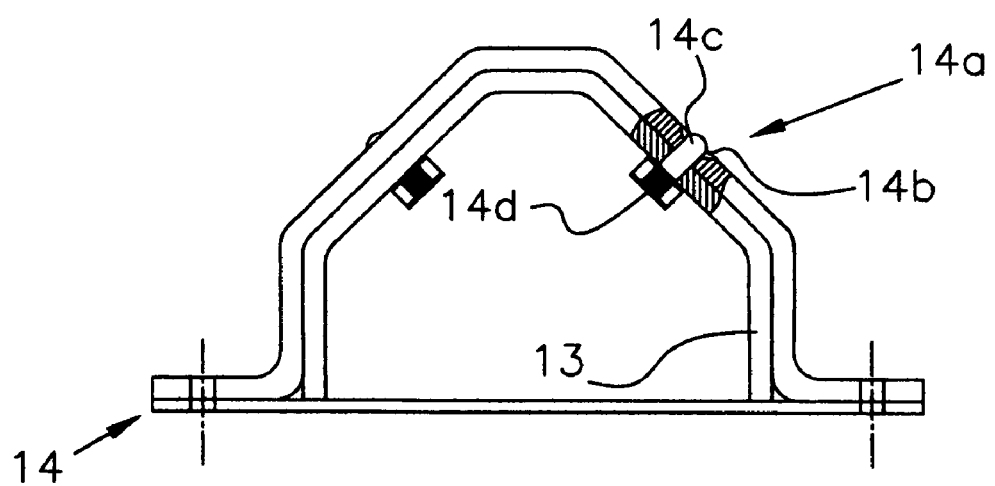
FIG. 2b is an elevational view of the bucket leg in accordance with the invention.
Figure 3:
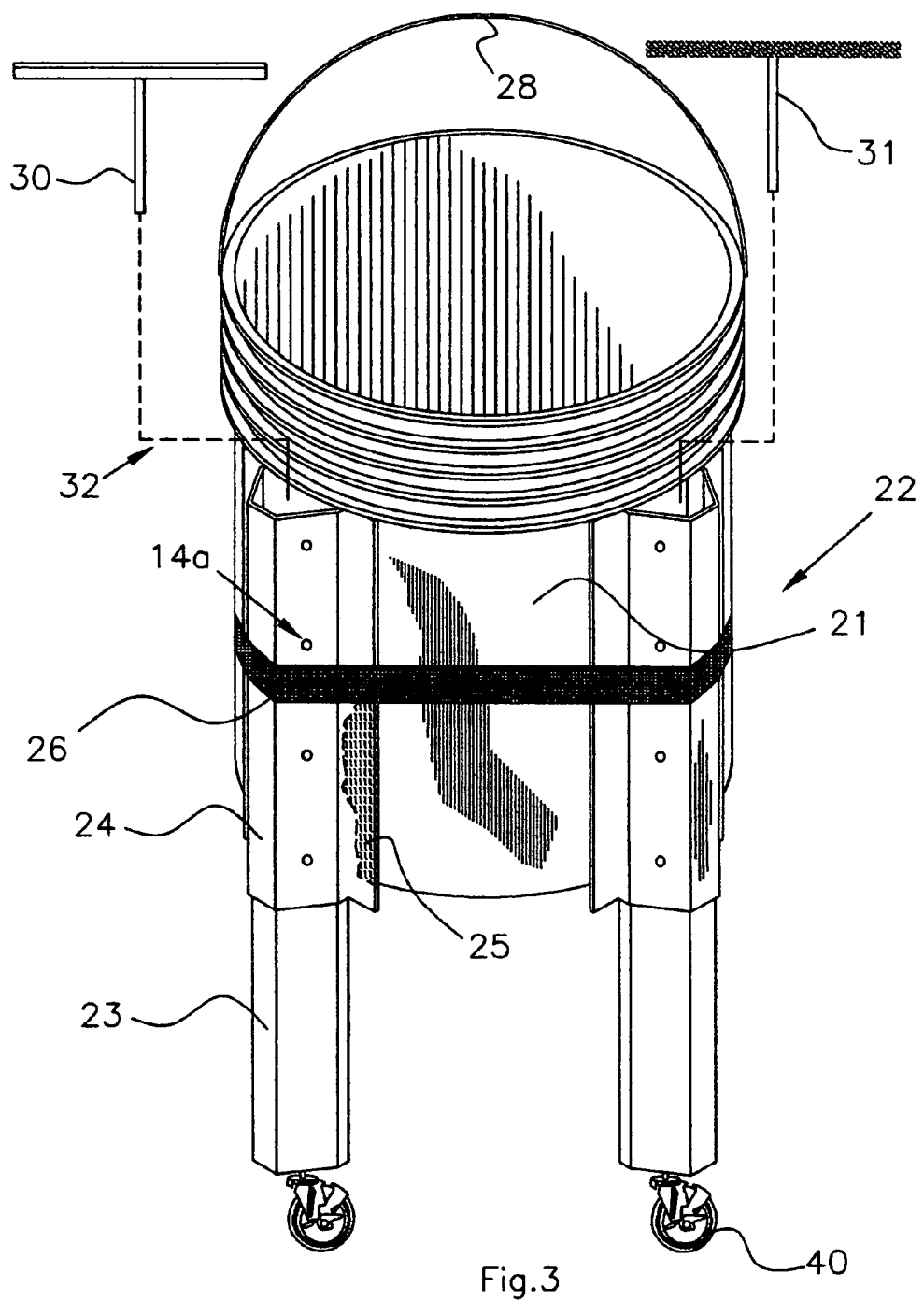
FIG. 3 is an isometric view of a second embodiment of the invention showing the relationship with tools.

Referring to FIG. 1, there is shown an assembly of the first embodiment of the plastic bendless legs of the invention generally designated by the numeral 10. FIG. 3 shows an assembly of the second embodiment of the invention generally designated by the numeral 22. The bucket 11, shown in FIG. 1, is generally rectangular. The bucket 21, shown in FIG. 2, is generally round. The buckets 11 and 21 are common window washing buckets generally used by all window washers. FIG. 2 shows the structure and assembly of the legs 14 and 24. The assembly and construction of legs 14 and 24 are identical, the differentiating features between each embodiment is simply the leg placement.

Figure 5:
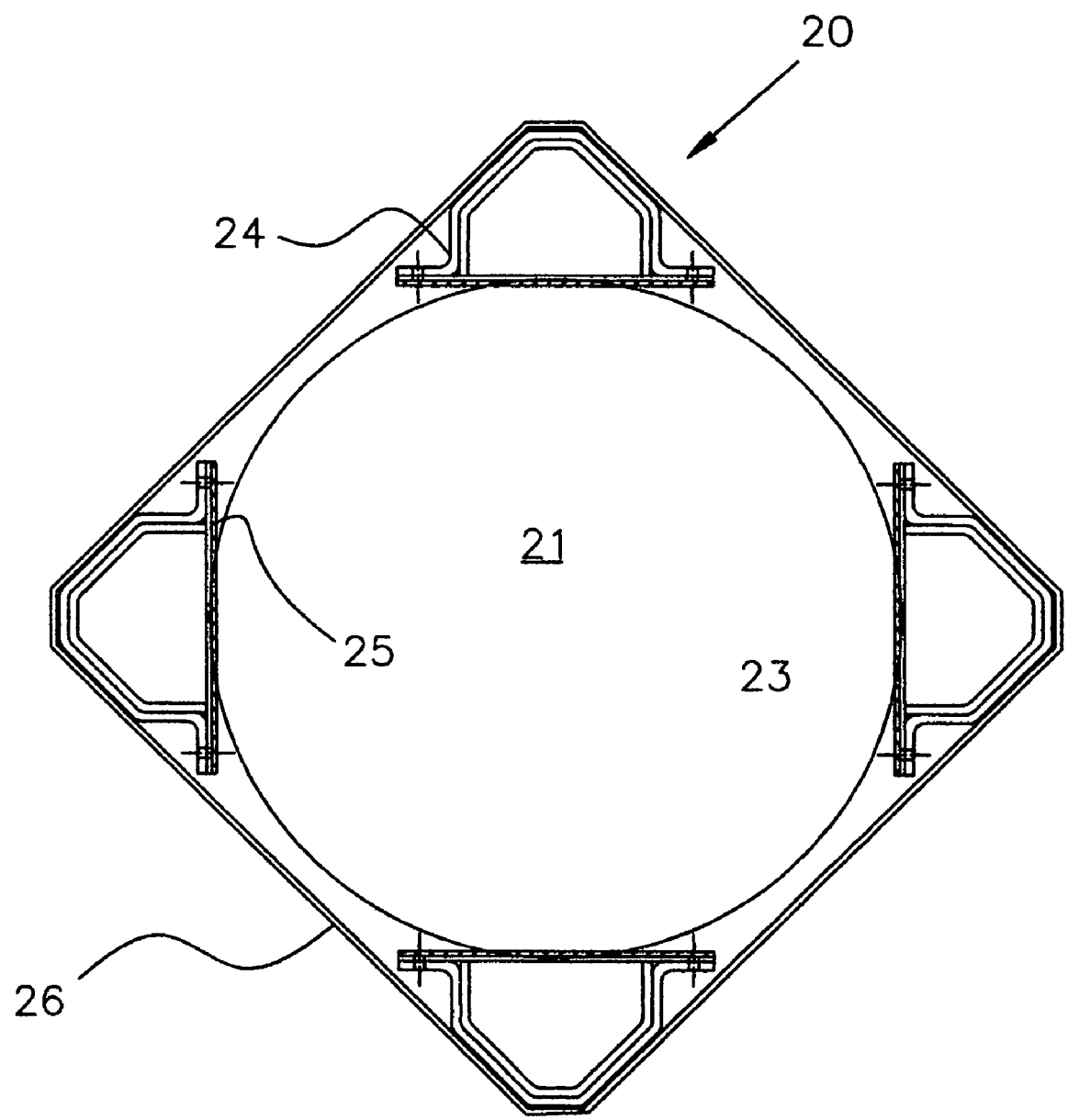
FIG. 5 is a top view of a second embodiment of the invention.

In FIGS. 1, 3 and 5, four sections of loop material 15 are fastened to the buckets 11 and 21 in positions where the legs 12 and 22 will be attached.

FIG. 5 shows a top view of the locations of the legs 12 and 22 in both embodiments. Strips of hook material 25 are fastened to the back sides of the upper portions 14 and 24 of legs 12 and 22.

Figure 4:
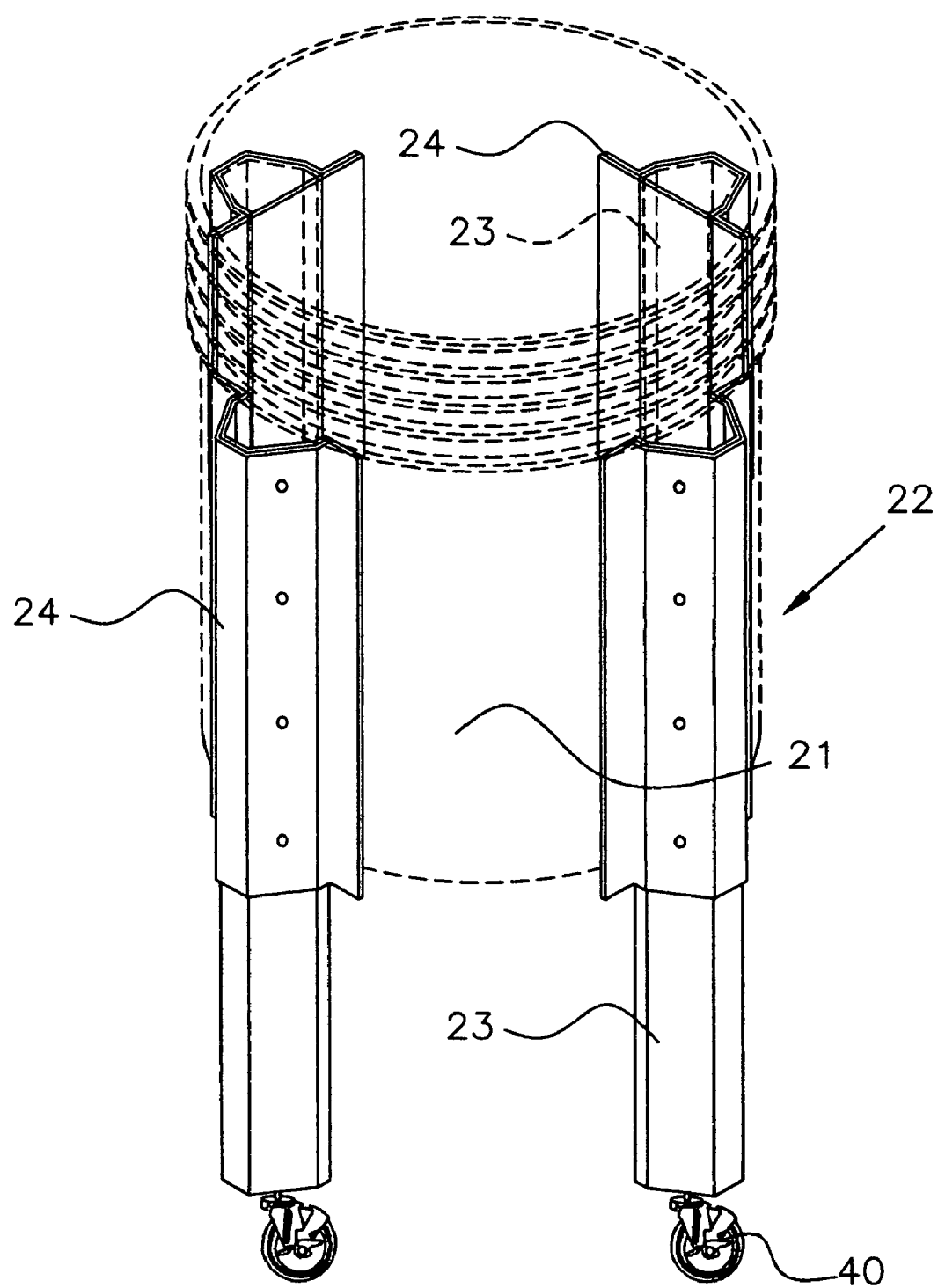
FIG. 4 is an isometric view, partially in section of a second embodiment of the invention showing the relative position of the bucket legs.

FIG. 2 shows the structure and assembly of the legs 12 and 22. The assembly of legs 12 and 22 are identical, the differentiating features between each embodiment is simply the leg placement. In FIG. 2, the lower portion 13 and upper portion 14, having holes 14a, may be nested as shown. In FIG. 4, the lower portion 23 and top portion 24 are nested as shown.

In FIG. 2a, spring retaining means 14d is affixed to the inner surface of leg section 13. Spring pin 14c protrudes through hole 14b to provide a securing means against the sliding movement of leg sections 13 and 14. After the legs 12 and 22 are affixed to the buckets 11 and 21, with the mating of the hook material 25 and loop material 15, a strap 16 or 26 is wrapped around the four legs 12 and 22 and fastened together to form a continuous loop to affix the legs to the buckets 11 and 21. Assembly of the legs 12 and 22 to the buckets may raise the working level of the buckets 11 and 12 three to four feet.

Handles 18 and 28 are provided for convenience in carrying the buckets 11 and 21. Dotted lines 32 indicate a scrubby 31 and squeegee 30 being inserted into the openings at the top portion of the legs 14 and 24, thereby providing convenient storage places for the cleaning tools.

A locking caster 40 is inserted in the bottom end of each lower portion 13 to provide for easy side movement of a filled bucket and to lock the bucket from unwanted movement.

What is claimed is:

1. A combination of a window cleaning apparatus and adjustable/removable legs, said combination comprising:
   a bucket for holding washing fluids for washing windows,
   four portions of loop material fastened to said bucket, said portions being equally spaced for providing positions for mounting attachments having hook material,
   four adjustable legs mounted on said bucket, each of said adjustable legs comprising an upper portion and a lower portion, said upper and lower portions each having a generally triangular shape and each having a top end and a bottom end, said top end having a portion of hook material fastened thereto for attaching to a corresponding loop portion fastened to said bucket and said top portion having a plurality of holes formed in spaced relationship,
   said lower portion being inserted within said upper portion and slidable within said upper portion, spring retaining means and a spring pin being mounted within each lower portion, each of said spring pins being mated with corresponding level holes in each of said upper portions, a strap being wrapped around said bucket mounted upper portions of said legs and fastened together, thereby affixing said legs to said bucket, and casters being inserted in each of said lower portions, said casters having locking means for preventing unintentional movement of said bucket.

\* \* \* \* \*